INVENTORS
JOSEPH M. CALLAN
CHARLES T. GERMANN
BY
ATTORNEYS

Dec. 22, 1959 J. M. CALLAN ET AL 2,918,621
FLAW DETECTOR FOR CONDUCTING MATERIALS
Filed Dec. 24, 1954 3 Sheets-Sheet 2

INVENTORS
JOSEPH M. CALLAN
CHARLES T. GERMANN
BY
Pennie, Edmonds, Morton, Barrows & Taylor.
ATTORNEYS

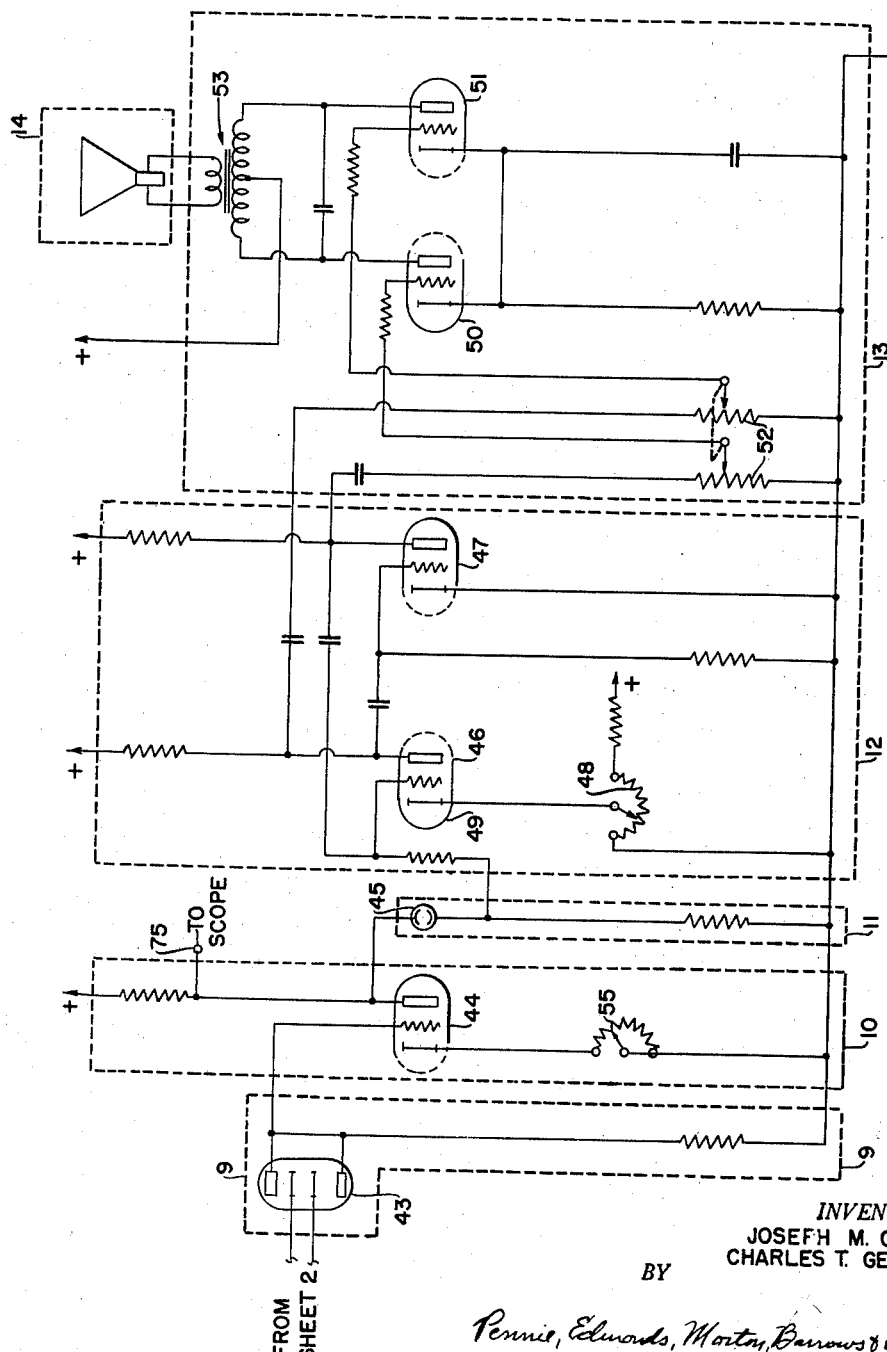

United States Patent Office 2,918,621
Patented Dec. 22, 1959

2,918,621

FLAW DETECTOR FOR CONDUCTING MATERIALS

Joseph M. Callan, Pelham Manor, N.Y., and Charles T. Germann, Woodcliffe Lake, N.J., assignors to Magnetic Analysis Corporation, Long Island City, N.Y., a corporation of New York Application December 24, 1954, Serial No. 477,526

9 Claims. (Cl. 324—37)

This invention relates to non-destructive testing and especially to electromagnetic testing of magnetic as well as non-magnetic conductive materials such as wire and elongated metal bars, tubes, and the like. The apparatus is especially suitable for detecting irregularities, such as longitudinal flaws, in the material.

The system of the invention operates upon the principle that, when the material is placed in an alternating-current electromagnetic field, the flaw interrupts the normal flow of induced eddy currents around the material, and the resulting disturbance in the magnetic field upsets the balance in a sensitive impedance bridge circuit which is symmetrically coupled to the same field. The output of the bridge circuit constitutes amplitude-modulated high-frequency test signals which are fed into a phase-sensitive demodulator circuit simultaneously with a carrier of the same high frequency but of adjustable phase. The resulting signals are rectified, amplified and subsequently indicated. In view of the several discriminatory features, including phase discrimination, it is possible to select the signals indicative of the flaws or other irregularities to be detected with a high degree of sensitivity and accuracy while eliminating undesired response to other variables which may occur both in the material under test and in the apparatus itself.

This invention is operable in connection with the apparatus described and claimed in copending application of Joseph M. Callan, Ser. No. 383,653, filed October 1, 1953, now Patent No. 2,797,386, and may advantageously be combined with it by suitable switching means or the equivalent so as to permit a more complete test or analysis of a given object or product.

Figure 1:
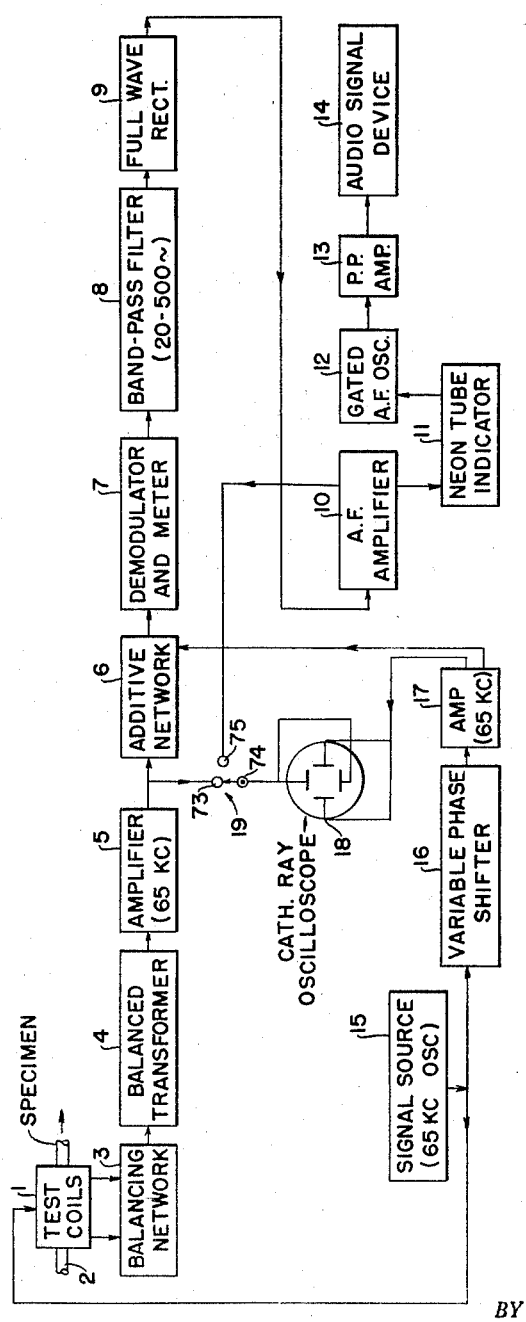
Figure 2:
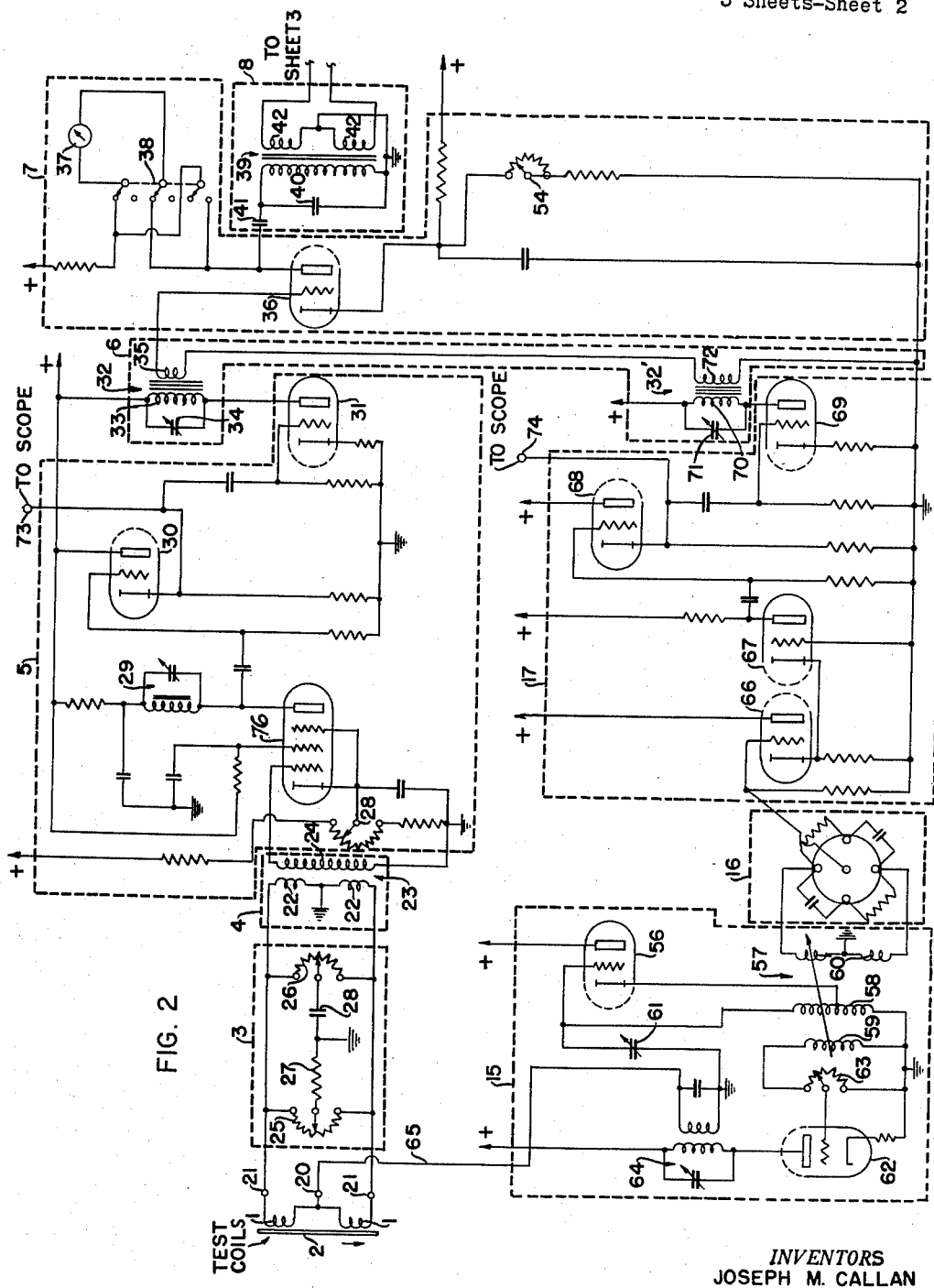

A more complete understanding of the invention will be had from the following description taken together with the drawings in which:

Fig. 1 is a block diagram of the apparatus in accordance with the invention; and Fig. 2 (consisting of two sheets) is a schematic circuit diagram of the system represented in Fig. 1.

Referring to the block diagram of Fig. 1, a pair of similar test coils 1 is represented as connected to a balancing network 3. The test specimen 2 is arranged so as preferably to pass through the coils. The output of the balancing network is connected to a balanced transformer 4 which is connected to the input of a carrier-frequency amplifier 5. As shown, test coils 1 are energized from a source 15 of high-frequency oscillations, for example 65 kc. The output of amplifier 5 is connected to the input of an additive network or summing device 6, the output signal from which is impressed upon demodulator 7 in the output circuit of which is an indicating meter. The output signal from the demodulator represents the variations or flaws in the test specimen. After passing through a band-pass filter 8, this signal is impressed on a full-wave rectifier 9, the output of which comprises pulses which represent the detected flaws in respect to the amplitude and duration. After amplification in low-frequency amplifier 10, these pulses are coupled through neon tube indicator 11 into gated audio-frequency oscillator 12. This neon tube thus serves not only as a voltage-amplitude delay coupling device but simultaneously as a visual indicator of the pulses. The output of oscillator 12 constitutes trains of audio-frequency pulses corresponding to the pulse output of rectifier 9. These AF pulses occur at the rate of the flaws, which is usually irregular, and are amplified by push-pull amplifier 13 and then impressed upon a suitable audio-frequency signal device 14 such as a loudspeaker. In this manner the pulses corresponding to the imperfections or flaws are, or may be, simultaneously indicated visibly and audibly.

The mentioned oscillator 15 which comprises the source of high-frequency signals for the test coils is also connected to furnish the same high-frequency carrier to a variable phase shifter 16 the output of which, after amplification in amplifier 17, is coupled into the above-mentioned additive network 6. The output of phase shifter 16 is manually adjustable over a phase-shift range from 0 to substantially 360 degrees, although in use the variation is ordinarily within 180 degrees. Thus, the composite signal impressed upon demodulator 7 comprises a high-frequency carrier having a signal modulation component initiated in the test coils 1 and another high-frequency component comprising the same carrier but shifted in phase depending upon the setting of the phase shifter 16. The purpose and effect of this combination of signal voltages will be described below.

Cathode-ray oscilloscope 18 is provided for the purpose of assisting in the adjustment of the variable phase shifter 16. By manipulation of switch 19 it is possible to display on the oscilloscope a waveform resulting from a combination of the signal appearing at the output of amplifier 17 with the signal appearing at the output of amplifier 5, or in the alternative with the signal appearing at the output of amplifier 10.

The circuit diagram of Fig. 2 shows circuit components and their connections in one embodiment of the apparatus comprising the system of the invention as represented in Fig. 1. Test coils 1 are similar and are symmetrically wound and connected so that with a high-frequency voltage impressed between them the voltage at the terminals 21 is equal, unless the magnetic fields of the coils are unsymmetrically influenced. The test coils may conveniently be wound from fine insulated wire each of the same number of turns on a tubular form of insulating material (200 turns of #36 B and S wire, for example), the coils being spaced apart on the same axis by a suitable distance, which may range from ⅛ inch to 4 or more inches, depending upon the physical form and nature of the imperfections to be detected. Their fields need not be mutually linked. The diameter of the coils would also depend largely upon the cross-sectional dimensions of the material under test, it being desirable to minimize the spacing between the surface of the material and the actual coil winding. These coils are equally energized by a high-frequency voltage from oscillator 15 applied at mid-terminal 20 and thus they function simultaneously as energizing and detecting, or test, coils. It is possible although less desirable, to employ a separate energizing coil closely coupled to the test coils 1 and symmetrically disposed with respect to them.

The output of the test coils 1 is connected through terminals 21 to the symmetrical and exactly similar primary windings 22 of a balanced transformer 23 having a secondary winding 24. This transformer may be provided with an iron core if desired. The polarities of coils 1 with respect to those of windings 22 should be such that the voltages from coils 1 are balanced out under normal conditions. Balancing network 3 serves to couple coils 1 to windings 22. This balancing network includes potentiometers 25 and 26, a resistor 27 connected between the sliders of potentiometer 25 and ground and a condenser 28 connected between the slider of potentiometer 26 and ground. Thus by separately adjusting potentiometers 25 and 26, and with the magnetic fields of coils 1 symmetrical, equal currents will flow through the two primary windings 22 in opposite directions and will cancel each other out with respect to the secondary winding 24 of transformer 23. If, due to unavoidable variations in components intended to be alike, or due to other unbalancing influences, the currents do not balance out as just described, adjustment of potentiometers 25 and 26 may be made to provide a balance. If a balance has been effected, it is evident that any variation in the test specimen 2 which produces a magnetic effect in one of the test coils to a different extent than in the other will unbalance the impedance bridge circuit between coils 1 and windings 22 and will produce a modification or modulation in amplitude of the carrier derived from oscillator 15 which, in the example presently described, may be assumed to be of substantially sine wave form and of constant amplitude at 65 kc. Since the modulated carrier fluctuates about zero, the term "modulated carrier" and the like, as used herein, should be understood to include modification of the carrier wave in respect to amplitude or polarity, or both.

The secondary winding 24 of transformer 23 is connected to the control grid of a remote-cut-off amplifier tube 76 (type 6SK7 is suitable) of which the amplification is controlled by a potentiometer 28 which adjusts the bias potential in the cathode circuit and thus the gain and sensitivity of the test of modulation signal channel. The output of tube 76 is coupled by means of resonant coupling circuit 29, which is tuned to the carrier frequency 65 kc., to the grid of tube 30. This tube comprises an amplifier of the cathode follower type. This cathode follower, in turn, is coupled to amplifier tube 31 in the output circuit of which additive network 6 is connected. Tubes 30, 31 may comprise two sections of a type 6SN7 tube. As here illustrated, network 6 includes two transformers 32 and 32' on which are wound respectively two tuned primary windings and two series-connected but separate secondary windings. One of these primary windings 33, which is tuned to the carrier by shunt condenser 34, is connected in the anode or output circuit of tube 31.

The characteristics of amplifier 5 and of transformer 32 are such as to pass a frequency band sufficient to include the side bands resulting from the higher modulating frequencies representing the irregularities or flaws to be detected. Commonly, in operation, this band comprises frequencies between 20 and 500 cycles per second, approximately. Secondary winding 35 of transformer 32 is connected to the grid of phase-sensitive demodulator 36 which, being a triode, also functions as an amplifier in well known manner. Windings 33, 35 of transformer 32 form part of an additive or summing network, the function of which will be described in more detail hereinafter. In the plate circuit of demodulator tube 36 an indicating meter 37 is connected. This meter may be of the zero-center type having a ringe of ± 0 to 500 microamperes. Meter 37 is connected in or out of circuit by manipulation of switch 38 which in the upper position, as shown, connects the meter in series in the plate circuit and which in the lower position disconnects the meter and closes the plate circuit. Rheostat 54 adjusts the bias on the cathode of tube 36 (the grid of which is normally biased below cut-off) and thus serves to adjust the meter to a midpoint or zero deflection in the absence of a modulation signal from the test coils, but in the presence of a phase-adjustable reference signal later to be described.

The filter network 8 consists of a low-frequency transformer 39 together with shunt and series condensers 40 and 41, respectively. Network 8 constitutes a band-pass filter for the modulation frequency band, here chosen to be of 20 to 500 cycles per second. This network thus eliminates very low-frequency potentials as well as various high-frequency potentials, including harmonics, based on the carrier. One purpose of this band-pass filter is to make the system responsive to the rate of change of the signal produced by a flaw, so that the greater the rate of change, the more the response. Therefore, this filter constitutes differentiating means. This rate of change response occurs in the frequency region lower than the pass-band. The secondary windings 42 of transformer 39 have a grounded center tap whereby the secondary as a whole is adapted to couple into the push-pull or full-wave rectifier 9 shown on Sheet 3 of the drawings. The rectifier tube 43 may be of the 6H6 type, the function of which is to apply signals, always of the same (negative) polarity, to the grid of low-frequency amplifier tube 44. This tube may comprise the second half of tube 36, type 6SL7 being suitable. A full-wave rectifier at this point is important because it provides a signal at the end as well as at the beginning of a long flaw.

The visual indicator 45 comprises a discharge tube of the neon type connected in the output circuit of amplifier 44 between plate and ground. Rheostat 55 controls the bias on the cathode of tube 44 and thereby serves to adjust the signal amplitude at which the neon tube will flash an indication. Coupled to tube 44 through the neon tube 45 is a multivibrator 12 comprising two tubes 46 and 47 which conveniently may comprise the two sections of a type 6SL7 tube. For present purposes the frequency of this multivibrator may be within the range of 500 to 2,000 cycles or more, because its principal function is to produce an output signal within the audio-frequency range. This multivibrator, being a gated oscillator, oscillates only when a signal pulse of sufficient amplitude is impressed on the grid of tube 46. Such signals occur whenever the output voltage of amplifier 44 is sufficiently high to fire the neon tube 45 which thereby becomes of lower resistance and impresses a signal voltage on the grid of tube 46. Hence neon tube 45 constitutes a coupling element of the voltage-delay type and also functions as a visual indicator. A biased diode as the coupling device and a visual indicator connected to its output would comprise a substantial, but more expensive, equivalent. Potentiometer 48, which adjusts the bias of cathode 49 of tube 46, controls the sensitivity of the multivibrator 12 and thus permits selection of the amplitude of the signal impressed upon the multivibrator which will cause it to produce oscillations.

Other types of audio-frequency oscillators can be substituted for the multivibrator herein shown, but they should be preferably of the gated type in order to produce a chain of oscillations commensurate with the period of the pulse impressed from the preceding circuits. Since some flaws to be detected are of extremely short duration, especially when the specimen under test moves rapidly past the test coils, it is desirable that this oscillator be capable of oscillating for a slightly longer period than that of the shortest flaw pulses so as to ensure in response to a short test signal a definite audible indicating signal which is formed by an audio-frequency system having an inherent lag. A related advantage of this audio indicator is that it indicates a defect close to the end of a bar, for example, by sounding a note which lasts longer than that which always occurs when the end of the bar passes through the test coils.

The audio-frequency pulses comprising the signal output of oscillator 12 are coupled through a push-pull connection to the grids of the push-pull amplifier 13 which includes two triode sections 50 and 51 of a tube such as type 6SN7. The grid circuits of these two tubes or sections include unicontrolled potentiometers 52 which constitute a volume control for the audible signal indication. The output of amplifier 13 is coupled through push-pull transformer 53 to a loudspeaker 14. Therefore, by adjustment of volume control 52 the loudspeaker may be set to sound an audio tone whenever the test signal exceeds a value predetermined by the adjustment of rheostat 55.

The source 15 of the high-frequency carrier, above referred to, includes a triode oscillator tube 56, in the cathode circuit of which is connected a high-frequency coupling transformer 57. This transformer comprises three windings 58, 59 and 60 of which winding 58 is inductance tuned by condenser 61 to the oscillator frequency of 65 kc. Variably coupled to primary winding 58 is the secondary winding 59 which is coupled to the grid of tube 62 by potentiometer 63. Tube 62 is a triode amplifier having a plate circuit 64 tuned to the carrier frequency. Amplifier tube 62 and oscillator tube 56 may comprise two sections of a type 6SN7 tube. The output of carrier source 15 is connected through connection lead 65 to the mid-terminal 20 of the test coils 1. By manipulation of potentiometer 63 the amplitude of the carrier may be preselected. The operating voltages for this oscillator and amplifier as well as for all the other tubes in the present system should be derived from a well-regulated power supply. Winding 58, which, as indicated, is connected in the oscillator circuit in cathode-follower fashion, is also coupled to secondary winding 60 which constitutes the input to the variable phase shifter 16. This secondary winding is grounded at its mid-point so that carrier-frequency potential of opposite phases is connected respectively to the two input terminals of the phase shifter. It is preferable that the degree of coupling between primary winding 58 and the two primary windings 59 and 60, respectively, be independently variable.

The phase shifter 16, as shown in the diagram, is represented by two capacitor and two resistor sections. This phase shifting system is of the four-quadrant-condenser type which is well known in the art, but other types of phase shifters could be substituted. Most phase shifters, per se, introduce some attenuation and therefore it is usually necessary to follow the phase shifter with a suitable amplifier. In this case the subsequent amplifier 17 is of the cathode coupled type in order to reduce the loading on the high-impedance phase shifter. This amplifier may comprise two sections of a type 6SL7 tube, the left-hand section 66 comprising the cathode follower and the right-hand section 67 constituting the amplifying portion. Coupled to the output of amplifier 67 is a second stage comprising two sections of another duo-triode tube for which the type 6SN7 is suitable. Here, as before, the left-hand section 68 in the diagram is the cathode follower and the right-hand section 69 is the amplifying portion. The output of amplifier 69, which comprises the phase-adjusted carrier, here assumed to be of 65 kc., is connected to the tuned input circuit comprising primary winding 70 of transformer 32' tuned by condenser 71, of the additive network 6. Secondary winding 72 is coupled to primary 70, being wound on the same core. It will be noted that secondary windings 72 and 35 are connected in series across the grid and cathode of demodulator 36. Thus the modulated carrier signal appearing across secondary 35 is added to the phase-shifted carrier signal appearing across secondary 72.

The demodulator circuit is so proportioned that in the absence of any modulation signals from the test coils the plate current as measured by meter 37 is approximately in the middle of the operating range of the meter, because the reference signal is always applied. (In the absence of the reference signal the tube 36 is biased below cut-off.) If a carrier signal voltage from the test channel is applied in phase with the reference voltage derived from the phase shifter circuit, the voltage at the grid of the demodulator tube 36 will be higher than that existing with zero carrier signal and consequently will produce a lower plate voltage. If these two signal voltages are 180° out of phase, the voltage at the plate of the demodulator tube will be higher because the plate current is lower. On the other hand if the carrier signal voltage is 90° out of phase with the reference voltage there will be substantially no change in voltage at the plate of the detector tube. Therefore, this phase-sensitive demodulator makes possible the rejection of a carrier signal 90° out of phase with the phase-shifted reference signal, and the acceptance of a signal, for subsequent indication, which is either in phase with the reference signal or 180° out of phase with it. In other words, the voltage at the plate of the demodulator tube is a measure of the modulation envelope of the test or carrier signal components which are in phase with the reference signal voltage. This condition exists in connection with the type of demodulator here illustrated, as well as with most other types, when the reference voltage is of such magnitude as to produce conduction in the demodulator tube for less than half a cycle of the reference voltage. In the embodiment herein described the modulation envelope may consist of modulation voltages of which the frequencies range between 0 and approximately 500 cycles per second.

It is well understood in the art that multi-grid tubes can be substituted for triodes, as demodulators, with substantially equivalent results, provided the magnitudes of the voltages impressed on the respective grids are chosen in relation to the degree of control effected by the respective grids. This is due to the fact that the anode current is more sensitive to changes in voltage impressed on the innermost grid (the grid closest to the cathode) than on an outer grid, as is shown by the characteristic curves of such tubes.

It will be noted that in Fig. 2, three terminals 73, 74 and 75 are labeled "To Scope." These terminals correspond to the terminals similarly numbered in Fig. 1 where switch 19 is located above the cathode-ray oscilloscope 18. The oscilloscope and its connections to this switch have been omitted from Fig. 2 to simplify the drawing. An oscilloscope is especially useful in connection with the system of this invention to permit proper adjustment of the phase shifter, as well as to provide certain specific information as to the occurrence and nature of defects which cannot otherwise readily be recognized. Assuming that the voltage applied to the horizontal deflecting plates is derived from the phase-shifted reference voltage and that the voltage applied to the vertical deflecting plates is the modulated signal voltage (which would be the case when the switch is connected to point 73), the variations in, or modulations of, the signal voltage which are in phase with the reference voltage will produce variations at the plate of the demodulator tube 36, and simultaneously the pattern on the oscilloscope will tilt up or down from a horizontal straight line. Signals which are the result of an out-of-phase variation cause the oscilloscope pattern to open up from a straight line into an ellipse or a circle. Thus by observing the nature of the pattern on the oscilloscope screen it is possible to adjust the phase selectively so as to produce maximum sensitivity for either the in-phase or the out-of-phase component and minimum sensitivity for a component 90° displaced. In the absence of a specimen or if a specimen having no flaw is in testing relation to the test coils, maximum opening and minimum tilting of the pattern will be displayed. If a bar of metal having a known flaw is inserted in the test coils, the phase-shifting control would be adjusted so that the flaw produces a tilt rather than an opening up of the pattern. This adjustment then assures that the signal which actuates the indicating devices will result from maximum sensitivity for the flaw and minimum sensitivity for variations which are out of phase with the flaw-modulation signal.

The above-described testing procedure may involve one possible source of error which can be corrected by a further adjustment. As previously mentioned in connection with band-pass filter 8, modulation variations of rather low frequency (for example, less than 20 c.p.s.) may result from variations in the material which may not be properly classified as flaws and which, therefore, are not to be indicated or recorded. However, such low-frequency modulations would be indicated on the oscilloscope by the test procedure above outlined. A display of such variations on the oscilloscope can be avoided by throwing switch 19 to contact 75, by which connection the demodulated and full-wave rectified test signal is applied to the vertical deflecting plates of the oscilloscope after having passed through the band-pass filter 8 which, as described, filters out modulation frequencies below 20 cycles per second. In this case, with proper phase adjustment the pattern displayed on the oscilloscope comprises a straight line which bounces up and down in accordance with variations of amplitude of the signal which is also applied to the indicating devices. Adjustment of the variable phase control will minimize the bouncing of this line in the absence of a flaw.

Although the procedure above described would probably be followed in the majority of cases, it sometimes happens that other variables in material such as bar stock or wire are of sufficient importance to be indicated. Such variables include those of diameter, resistivity and magnetic properties. Since the test signal variations due to such irregularities in the material are usually distinguishable from each other by relative phase differences, it is apparent that the system of the present invention is capable of adjustment so as to discriminate between such irregularities. This can be achieved by inserting in the coils a test specimen of the material known to have such irregularities and adjusting the phase-shifter, with the aid of the oscilloscope, so that the irregularities desired to be indicated produce a maximum oscilloscope deflection. The volume controls can then be set to cause response by the visual and audible indicators, if desired.

The meter 37 is useful not only in connection with adjusting the apparatus as above explained, but also, under certain conditions, as a flaw indicator, especially in that it permits the accurate location of a flaw in the specimen under test. In normal use in testing for flaws in elongated material such as rod or wire, for example, the flashing neon tube and the audible signal horn or loudspeaker indicate the existence of the flaw, but not the exact location of it along the material even though the progress of the bar or wire be stopped immediately after observance of the indication. However, after having stopped the motion of the material the operator may move the material back and forth through the test coils by hand while observing the meter and thus can located the flaw with considerable accuracy because the rate of signal variation can thereby be manually regulated to provide a signal fluctuation sufficiently slow to produce a good response by the meter.

We claim:

1. Metal-testing apparatus including an impedance bridge circuit of which the input is adapted to be electromagnetically coupled to successive portions of the material under test, means for balancing said bridge circuit under normal test conditions, a source of carrier frequency symmetrically coupled to the input of said bridge circuit whereby to develop in said bridge circuit a carrier signal modulated in accordance with variations in said material, a carrier-frequency amplifier coupled to the output of said bridge circuit, voltage-combining means coupled to the output of said amplifier, adjustable phase-shifting means coupled between said carrier-frequency source and said voltage-combining means whereby a reference signal derived from said carrier source and of phase adjustable with respect to the phase of the modulated carrier signal is combined with the modulated carrier signal, a phase-sensitive demodulator coupled to the output of said combining means, means establishing the reference signal voltage at a magnitude such as to produce conduction in said demodulator for less than half a cycle of said reference signal, modulation-responsive indicating means, a full-wave rectifier, band-pass filter means coupling said demodulator to said rectifier, said filter means being proportioned to pass substantially only the frequencies of said modulation, indicating means responsive to said modulation, and amplifier means coupling the output of said filter means to said indicating means.

2. Metal-testing apparatus including a pair of similar test coils adapted to be disposed in simultaneous symmetrical electromagnetic relation to two different portions of a specimen under test, a high-frequency carrier source having an output symmetrically connected to said coils, an impedance bridge network in which said coils are connected as input impedance, a transformer having a primary balanced with respect to ground and connected in said bridge network as output impedance, a plurality of balancing elements including an adjustable impedance which is connected in said bridge network symmetrically with respect to ground between said input and output impedances, a carrier-frequency amplifier coupled to the secondary of said transformer and adapted to amplify carrier-frequency voltage which is modulated at low frequencies by the relative inductive effects of variations in said specimen on said coils, respectively, to produce carrier signals modulated in amplitude or phase, an adjustable phase-shifting network connected to the output of said carrier source and adapted to provide reference voltage signals of said carrier frequency and of phase adjustable with respect to the phase of the modulated carrier signals, a phase-sensitive demodulator including a demodulator tube and means for adding the modulated carrier and reference signals, whereby to demodulate the added signals, means establishing the reference signal voltage at a magnitude such as to produce conduction in said demodulator tube for less than half a cycle of said reference signal, a bandpass filter proportioned to pass substantially only the modulation signals derived from said demodulator, a full-wave rectifier coupled to the output of said filter, and a low-frequency-signal indicating device coupled to the output of said rectifier.

3. Apparatus according to claim 2 in which said test coils are connected in series, and said bridge network comprises two potentiometers, one connected across the extreme terminals of said pair of coils and the other is connected across the primary terminals of said transformer, a resistor and a condenser connected in series between the adjustable arms of said potentiometers, and a connection to ground from a point between said resistor and condenser.

4. Metal-testing apparatus including a pair of similar test coils adapted to be disposed in simultaneous symmetrical electromagnetic relation to two different portions of a specimen under test, a high-frequency carrier source having an output symmetrically connected to said coils, an impedance bridge network in which said coils are connected as input impedance, a transformer having a primary balanced with respect to ground and connected in said bridge network as output impedance, a plurality of balancing elements including an adjustable impedance which is connected in said bridge network symmetrically with respect to ground between said input and output impedances, a carrier-frequency amplifier coupled to the secondary of said transformer and adapted to amplify carrier-frequency voltage which is modulated at low frequencies by the relative inductive effects of variations in said specimen on said coils, respectively, to produce carrier signals modulated in amplitude or phase, an adjustable phase-shifting network connected to the output of said carrier source and adapted to provide reference voltage signals of said carrier frequency and of phase adjustable with respect to the phase of the modulated carrier signals, a phase-sensitive demodulator including a demodulator tube and means for adding the modulated carrier and reference signals, whereby to demodulate the added signals, means establishing the reference signal voltage at a magnitude such as to produce conduction in said demodulator tube for less than half a cycle of said reference signal, a bandpass filter proportioned to pass substantially only the low-frequency modulation signals derived from said demodulator, a full-wave rectifier coupled to the output of said filter, a low-frequency-signal-indicating device coupled to the output of said rectifier, a cathode-ray oscilloscope and means including switching means connecting one set of oscilloscope deflection plates to the output of said phase shifter and the other set of deflection plates to the output of said carrier-frequency amplifier or alternatively to the output of said rectifier.

5. Metal-testing apparatus including a pair of similar test coils adapted to be disposed in simultaneous symmetrical electromagnetic relation to two different portions of a specimen under test, a high-frequency carrier source having an output symmetrically connected to said coils, an impedance bridge network in which said coils are connected as input impedance, a transformer having a primary balanced with respect to ground and connected in said bridge network as output impedance, a plurality of balancing elements including an adjustable impedance which is connected in said bridge network symmetrically with respect to ground between said input and output impedances, a carrier-frequency amplifier coupled to the secondary of said transformer and adapted to amplify carrier-frequency voltage which is modulated at low frequencies by the relative inductive effects of variations in said specimen on said coils, respectively, to produce carrier signals modulated in amplitude or phase, an adjustable phase-shifting network connected to the output of said carrier source and adapted to provide reference voltage signals of said carrier frequency and of phase adjustable with respect to the phase of the modulated carrier signals, a phase-sensitive demodulator including a demodulator tube and means for adding the modulated carrier and reference signals, whereby to demodulate the added signals, means establishing the reference signal voltage at a magnitude such as to produce conduction in said demodulator tube for less than half a cycle of said reference signal, means responsive to the rate of change of the signals produced by said test coils which comprises means for discriminating against the lower frequency modulation signals, a full-wave rectifier coupled to the output of said last-named means, a low-frequency amplifier, means for producing an audible signal in response to signal pulses impressed thereon from said low-frequency-amplifier, and a visual pulse-indicator comprising a discharge tube connected as a coupling device between said low-frequency amplifier and said last-mentioned means.

6. Metal testing apparatus including inductive means for generating eddy currents in the metal under test and for developing an A.C. voltage related to variations in said eddy currents, said means being adapted to be electromagnetically coupled to successive portions of said metal, a source of carrier frequency coupled to the input of said voltage-developing means whereby to develop in said voltage-developing means a carrier signal modulated in accordance with variations in said metal, phase sensitive demodulation means and means for impressing said modulated carrier signal thereon to produce a demodulated signal, differentiating means coupled to the output of said demodulation means and responsive to the rate of change of the demodulated signal for producing a differentiated signal, indicating means actuated by said differentiated signal and responsive substantially only to the rate of change of the demodulated component of said signal, and means coupling said indicating means to the output of said differentiating means.

7. Apparatus for electromagnetically testing conductive metallic material for flaws which includes in combination, a source of high-frequency voltage, means for deriving from said source first and second high-frequency voltage waves of the same frequency, means for modifying said first voltage waves with respect to phase only, means for generating a magnetic field from said second voltage waves only, means disposing said field so as to be adapted to receive material to be tested therein whereby eddy currents are induced in said material, circuit means in which said second voltage waves are modified with respect to amplitude and phase as a function of and in response to variations in said eddy currents, means for combining and demodulating said first and second voltage waves as thus modified to form an exclusively low-frequency output wave which is a measure of the envelope of the combined waves, and means responsive to the rate of change of amplitude of said output wave to indicate flaws in the material.

8. Apparatus for electromagnetically testing elongated conductive metallic material for flaws which includes in combination, a source of high-frequency voltage, means for deriving from said source first and second high frequency voltage waves of the same frequency, means for modifying said first voltage waves with respect to phase only, means for generating a magnetic field from said second voltage waves only, means disposing said field so as to be adapted to receive successive portions of material to be tested therein whereby eddy currents are induced in said successive portions of material, circuit means in which said second voltage waves are modified with respect to amplitude and phase as a function of and in response to variations in said eddy currents, means for combining and demodulating said first and second voltage waves as thus modified to form an exclusively low-frequency output wave which is a measure of the envelope of the combined waves, differentiating means for differentiating said output wave, and means coupled to said differentiating means and responsive to the differentiated output wave to indicate flaws in the material.

9. Apparatus for electromagnetically testing conductive material for flaws which includes in combination, a source of high-frequency voltage, means for deriving from said source first high-frequency voltage waves of a certain amplitude, coil means for establishing from said first voltage waves a magnetic field into which material under test may be introduced whereby to induce eddy currents in said material, circuit means in which second high-frequency voltage waves are produced in response to variations in said eddy currents caused by flaws in the material, means for amplifying said second voltage waves, means for combining and demoduating said first and second voltage waves to form an exclusively low-frequency output wave which is a measure of the envelope of the combined waves, means for deriving from said output wave an output voltage which is a measure of the rate of change thereof, and means responsive to the amplitude of said output voltage to indicate flaws in the material.

References Cited in the file of this patent
UNITED STATES PATENTS

| 1,954,996 | Hehn | Apr. 17, 1934 |
| 2,124,577 | Knerr | July 26, 1938 |
| 2,455,792 | Meunier | Dec. 7, 1948 |
| 2,489,920 | Michel | Nov. 29, 1949 |
| 2,594,947 | Lynch | Apr. 29, 1952 |
| 2,806,992 | Foerster | Sept. 17, 1957 |

OTHER REFERENCES

Electronics, January 1946, pages 105–109, article by Doll et al.